United States Patent
Religa et al.

(10) Patent No.: US 11,729,009 B1
(45) Date of Patent: Aug. 15, 2023

(54) INTELLIGENT MEETING AGENT

(71) Applicant: Microsoft Technology Licensing, LLC, Redmond, WA (US)

(72) Inventors: Tomasz Lukasz Religa, Seattle, WA (US); Max Wang, Seattle, WA (US); Huitian Jiao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/672,474

(22) Filed: Feb. 15, 2022

(51) Int. Cl.
*G06F 15/16* (2006.01)
*H04L 12/18* (2006.01)
*G06N 20/00* (2019.01)

(52) U.S. Cl.
CPC ...... *H04L 12/1818* (2013.01); *H04L 12/1831* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,420,108 B1 | 8/2016 | Bostick et al. | |
| 10,445,706 B2 | 10/2019 | Kitada et al. | |
| 11,216,787 B1 * | 1/2022 | Shetty | G06Q 10/1095 |
| 11,336,706 B1 * | 5/2022 | Saito | H04L 65/403 |
| 2010/0205542 A1 | 8/2010 | Walman | |
| 2012/0284640 A1 | 11/2012 | Sloyer et al. | |
| 2013/0263017 A1 | 10/2013 | Moyers et al. | |
| 2014/0229218 A1 * | 8/2014 | Abuelsaad | G06Q 10/1095 705/7.19 |
| 2016/0182580 A1 * | 6/2016 | Nayak | H04L 65/4038 709/204 |
| 2018/0191907 A1 * | 7/2018 | Herrin | H04L 12/1831 |
| 2018/0218734 A1 * | 8/2018 | Somech | G06F 8/70 |
| 2018/0232114 A1 | 8/2018 | Saunshi et al. | |
| 2019/0273767 A1 * | 9/2019 | Nelson | H04M 7/0027 |
| 2019/0340554 A1 * | 11/2019 | Dotan-Cohen | G06Q 10/06313 |
| 2019/0378076 A1 | 12/2019 | O'gorman et al. | |
| 2020/0145530 A1 * | 5/2020 | Renner | H04M 7/0045 |
| 2020/0279567 A1 * | 9/2020 | Adlersberg | G06F 40/35 |

(Continued)

OTHER PUBLICATIONS

"International Search Report and Written Opinion Issued in PCT Application No. PCT/US22/050817", dated Mar. 17, 2023, 12 Pages.

(Continued)

*Primary Examiner* — Phyllis A Book
(74) *Attorney, Agent, or Firm* — NovoTechIP International PLLC

(57) ABSTRACT

A system and method and for monitoring an online meeting includes receiving an indication that the online meeting has been started, retrieving meeting metadata associated with the online meeting, meeting content data from the online meeting, and user data associated with one or more meeting invitees; providing at least one of the meeting metadata, meeting content data and the user data to a machine-learning model for detecting a meeting stage for the online meeting in real-time, determining and based on at least one of the detected meeting stage, meeting content data or the user data that a notification about the online meeting should be provided to one of the meeting invitees, generating data for the notification, and providing the data for the notification for display to the meeting invitee.

17 Claims, 11 Drawing Sheets

(56) References Cited

U.S. PATENT DOCUMENTS

| | | |
|---|---|---|
| 2020/0374146 A1 | 11/2020 | Chhabra et al. |
| 2020/0403816 A1 | 12/2020 | Daredia et al. |
| 2020/0403817 A1* | 12/2020 | Daredia ................ G06F 16/345 |
| 2021/0111916 A1* | 4/2021 | Velayutham ........ H04L 12/1827 |
| 2021/0399911 A1* | 12/2021 | Jorasch ................ H04L 65/403 |
| 2022/0157058 A1 | 5/2022 | Raethke et al. |
| 2022/0337443 A1 | 10/2022 | Sood et al. |

OTHER PUBLICATIONS

"Notice of Allowance Issued in U.S. Appl. No. 17/866,244", dated Apr. 27, 2023, 21 Pages.

* cited by examiner

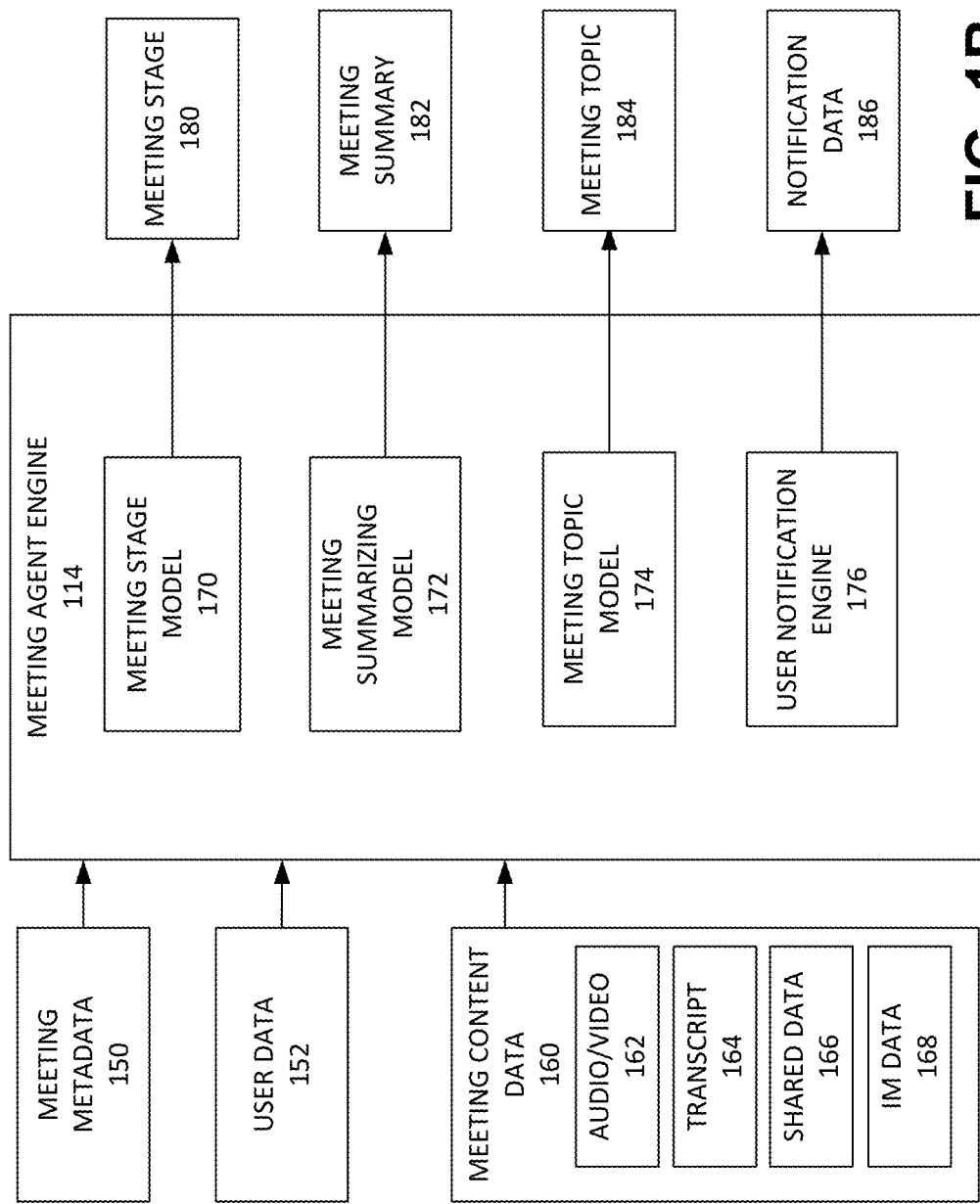

INTELLIGENT MEETING AGENT

BACKGROUND

With the increased use of remote and flexible work and learning environments, virtual meetings have become a common occurrence for many users. As a result, the number of meetings many users are invited to has significantly increased. This often results in some meetings being scheduled at overlapping times. As a result, users are often not able to attend every meeting they are invited to and may thus miss an opportunity to participate in portions of a meeting that is important to them.

Furthermore, with many meetings being scheduled on a daily basis, a significant portion of the user's day being overtaken by meetings. This often results in an inefficient use of the user's time, particularly since in many meetings there are portions that are not relevant to all attendees. To balance the need to participate in portions of meetings that are important to them, many users join meetings and try to follow what occurs at the meeting, while at the same time, working on other projects. However, this may result in the user being distracted by the task they are working on and not be able to determine when their attention or input is needed at the meeting. This could lead to other meeting attendees having to get the attention of the distracted attended which could be both embarrassing and waste other meeting attendee's time.

Hence, there is a need for improved systems and methods of intelligently monitoring meeting content and notifying meeting invitees, when needed.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving an indication that an online meeting has been started, retrieving meeting metadata associated with the online meeting, meeting content data from the online meeting, and user data associated with one or more meeting invitees, providing at least one of the meeting metadata, meeting content data and the user data to a machine-learning model for detecting a meeting stage for the online meeting in real-time, determining, via the processor, and based on at least one of the detected meeting stage, meeting content data or the user data that a notification about the online meeting should be provided to one of the one or more meeting invitees, upon determining that the notification about the online meeting should be provided, generating data for the notification, and providing the data for the notification for display to the one of the one or more meeting invitees.

In yet another general aspect, the instant disclosure presents a method for monitoring an online meeting. In some implementations, the method includes receiving an indication that the online meeting has been started, retrieving meeting metadata associated with the online meeting, meeting content data from the online meeting, and user data associated with one or more meeting invitees, providing at least one of the meeting metadata, meeting content data and the user data to a machine-learning model for detecting a meeting stage for the online meeting in real-time, determining, via the processor, and based on at least one of the detected meeting stage, meeting content data or the user data that a notification about the online meeting should be provided to one of the one or more meeting invitees, upon determining that the notification about the online meeting should be provided, generating data for the notification, and providing the data for the notification for display to the one of the one or more meeting invitees.

In a further general aspect, the instant application describes a non-transitory computer readable medium on which are stored instructions that when executed cause a programmable device to perform functions of receiving an indication that an online meeting has been started, retrieving meeting metadata associated with the online meeting, meeting content data from the online meeting, and user data associated with one or more meeting invitees, providing at least one of the meeting metadata, meeting content data and the user data to a machine-learning model for detecting a meeting stage for the online meeting in real-time, determining, via the processor, and based on at least one of the detected meeting stage, meeting content data or the user data that a notification about the online meeting should be provided to one of the one or more meeting invitees, upon determining that the notification about the online meeting should be provided, generating data for the notification, and providing the data for the notification for display to the one of the one or more meeting invitees.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1B depicts an example data flow between some elements of an example system upon which aspects of this disclosure may be implemented.

DETAILED DESCRIPTION

Figure 1A:
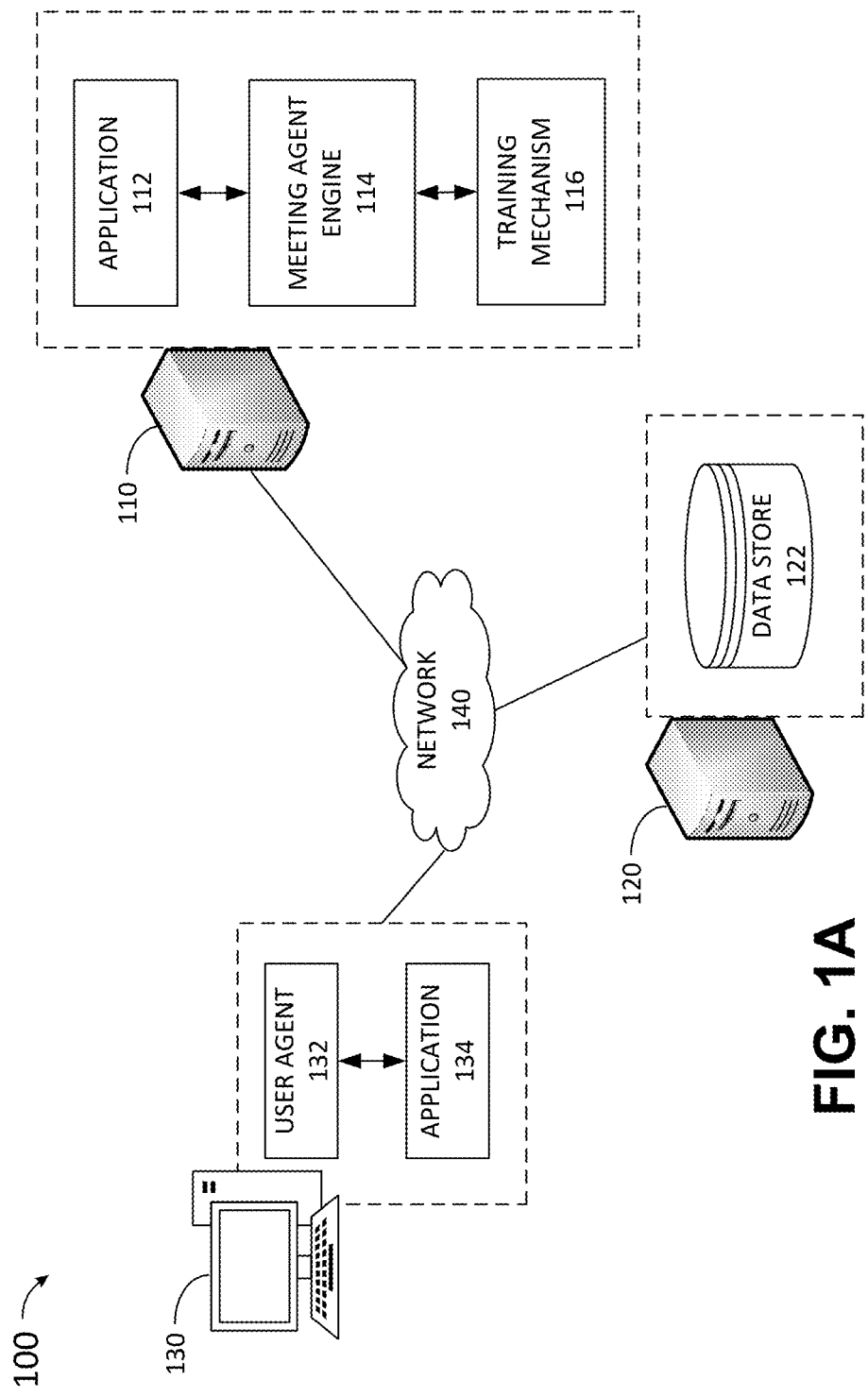
FIG. 1A depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

With the recent increase in remote collaboration, users are experiencing a significant increase in use of virtual meetings. As a result, daily virtual meeting time for many users has substantially increased. This often results in overlapping meeting times and/or meetings taking up a significant amount of productive time from users. Moreover, in many organizations a meeting culture arises where meeting invitations are sent to anyone vaguely relevant to the meeting, even though their input may only be required for a short section, or perhaps not at all. This is especially notable in cross-discipline meetings and is not an efficient use of time for meeting participants. However, when a meeting invitation is received, users may feel obligated to attend the meeting or they may need to choose a meeting to attend from among two or more overlapping meetings. Furthermore, many times the users must sit through many sections of a meeting that is irrelevant to them and continue paying attention until a section that is related to them occurs. This is not only inconvenient, but a substantially inefficient use of time for many users. Thus, there exists a technical problem of lack of adequate mechanisms for managing meetings and enabling users to participate in portions that are relevant to them.

To address these technical problems and more, in an example, this description provides technical solutions for intelligently monitoring online meetings and notifying a meeting invitee when their attention is needed. The technical solution includes real-time monitoring of meeting content such as such as audio output from the online meeting, transcriptions of the audio input, content of documents shared during the online meeting, user information such as organizational graph data, chat data collected from the online meeting, screen content from the online meeting, the identity of active participants, and any other metadata available from the online meeting. The technical solution utilizes one or more machine-learning models and/or logical mechanism to analyze the collected data and determine a real-time meeting stage for the online meeting, create a summary of the meeting in real-time, and/or determine when a meeting invitee's attention is needed at the meeting. When it is determined that a meeting invitee's attention in the meeting is needed, the technical solution includes providing a notification to the meeting invitee. The notification may be sent when the meeting invitee has not joined the meeting, may include the event that prompted the notification as well as other information about the meeting that enables the user to effectively engage with the meeting, and may enable the user to join the meeting in real-time. The notification may also be sent to a passive meeting attendee, when the technical solution determines that while the meeting attendee is a participant in the meeting, they are not actively participating. In this manner, the technical solution provides an easy to use mechanism to manage one or more meetings, thus enabling the users to take part in only sections of meetings that are important to them. This significantly improves time management for meeting participants and increases user satisfaction.

The technical solution described herein addresses the technical problem of inefficient use of online meetings and achieves technical effects by providing a system and method for automatically monitoring meeting content as well as other relevant data in real-time to notify users of meeting content they may have missed and/or alert them when their attention may be needed at an online meeting. The technical solution allows a viewer to navigate quickly and efficiently to access data relevant to an ongoing meeting and activate a function to join the meeting in real-time or activate the meeting screen, and therefore improves graphical user interfaces for electronic devices. The technical effects at least include (1) improving the efficiency of using an electronic device to attend an online meeting by automatically monitoring meeting content and brining relevant meeting content to the user's attention; (2) improving the viewer's navigation speed when their attention is needed at a meeting; and (3) increasing relevancy and flexibility of the data displayed to the viewer on the meeting screen.

As will be understood by persons of skill in the art upon reading this disclosure, benefits and advantages provided by such implementations can include, but are not limited to, a technical solution to the technical problems of lack of mechanisms for efficient and user-friendly management of online meetings. Technical solutions and implementations provided herein offer a mechanism for automatically monitoring meeting content and notifying users who are not able to actively participant in a meeting. The benefits made available by these technology-based solutions provide a user-friendly mechanism for automatically monitoring and managing online meetings.

As used herein, the terms "online meeting," may refer to a virtual meeting or an audio/video conference conducted via an electronic device where the meeting participants are located in different geographical locations. The term "meeting invitee" may refer to any person who has been invited to an online meeting. Furthermore, as used herein, the term "meeting attendee" may refer to a meeting invitee who has joined the online meeting using a computing device.

FIG. 1A illustrates an example system 100, upon which aspects of this disclosure may be implemented. The system 100 may include a server 110, which may itself include an application 112, a meeting agent engine 114 and a training mechanism 116. While shown as one server, the server 110 may represent a plurality of servers that work together to deliver the functions and services provided by each engine or application included in the server 110. The server 110 may operate as a shared resource server located at an enterprise accessible by various computer client devices such as a client device 130. The server 110 may also operate as a cloud-based server for offering meeting agent services in one or more applications such as application 112 and/or application 134.

The server 110 may include and/or execute a meeting agent engine 114, which may receive a request for monitoring and analyzing an online meeting from an application such as the application 112 or 134 and may process the request by retrieving various types of data about the online meeting. The data may include audio and/or video data from the online meeting, transcription data from a transcription service, metadata such as the list of meeting invitees, active meeting participants, meeting type, meeting topic, documents shared in the meeting, meeting chat content, associations between meeting invitees and the like. The meeting agent 114 may provide the retrieved information to one or more ML models for analyzing the content to determine a meeting stage for the meeting, create a meeting summary, determine a topic for the meeting, and/or determine when an inactive or absent meeting invitee's attention is needed in the meeting. The request to monitor a meeting may be transmitted to the meeting agent engine 114 when an online meeting begins and the applications 112 or 134 determine that a meeting invitee is not participating in the meeting, or an attending invitee is not actively paying attention to the meeting. Alternatively, the request may be transmitted for all meetings or certain types of meeting that are determined to have a specific significance or importance, or which a meeting invitee has requested information. The request may be transmitted automatically via the application 112 or 134. The meeting agent engine 114 may be executed in the background.

The meeting agent engine 114 may include separate modules for processing the audio, video and textual inputs. Furthermore, the meeting agent engine 114 may include a separate element for comparing the output of the various modules to determine if a notification to a user is needed. One or more modules and elements of the meeting agent engine 114 may include one or more ML models. The internal structure of and data flow between the various elements of the meeting agent engine 114 are discussed in greater detail with respect to FIG. 1B.

One or more ML models implemented by the meeting agent engine 114 may be trained by the training mechanism 116. The training mechanism 116 may use training data sets stored in the data store 122 to provide initial and ongoing training for each of the models. Alternatively, or additionally, the training mechanism 116 may use training data sets from elsewhere. In some implementations, the training mechanism 116 uses labeled training data to train one or more of the models via deep neural network(s) or other types of ML models. The initial training may be performed in an offline stage. Additionally, and/or alternatively, the one or more ML models may be trained using batch learning.

As a general matter, the methods and systems described herein may include, or otherwise make use of one or more ML model to perform natural language processing (NPL), analyze content to determine meeting stages, summarize meeting content and determine when a user's attention is needed at a live online meeting. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activities, determine associations between various words and users, and identify keywords and/or classify content. Such training may be made following the accumulation, review, and/or analysis of data over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The system 100 may include a server 120 which may be connected to or include the data store 122 which may function as a repository in which databases relating to training models, organization graph data and/or meeting data may be stored. Although shown as a single data store, the data store 122 may be representative of multiple storage devices and data stores which may be accessible by one or more of the meeting agent engine 114, training mechanism 116, and application 112.

The client device 130 may be connected to the server 110 via a network 140. The network 140 may be a wired or wireless network(s) or a combination of wired and wireless networks that connect one or more elements of the system 100. The client device 130 may be a personal or handheld computing device having or being connected to input/output elements that enable a user to interact with various applications (e.g., application 112 or application 134) that allow the user to participate in an online meeting. Examples of suitable client devices 130 include but are not limited to personal computers, desktop computers, laptop computers, mobile telephones; smart phones; tablets; phablets; smart watches; wearable computers; gaming devices/computers;

televisions; and the like. The internal hardware structure of a client device is discussed in greater detail with respect to FIGS. 5 and 6.

The client device 130 may include a local application 134. The application 134 may be a computer program executed on the client device that configures the device to be responsive to user input to allow a user to participate in an online meeting. Examples of suitable applications include, but are not limited to, a video conferencing application (e.g., Microsoft Teams), a collaborative work application, a presentation application, and a communications application.

In some examples, the application used to participate in an online meeting is executed on the server 110 (e.g., application 112) and provided via an online service. In some implementations, web applications communicate via the network 140 with a user agent 132, such as a browser, executing on the client device 130. The user agent 132 may provide a user interface that allows the user to interact with the application 112. User data from the application 134 or application 112 may be provided via the network 140 to the meeting agent engine 114 for use in providing meeting assistance.

FIG. 1B depicts an example data flow between some of the elements of the example system 100. The meeting agent engine 114 may include a meeting stage model 170, a meeting summarizing model 172, a meeting topic model 174, and a user notification engine 176. In some implementations, a request to monitor and manage an online meeting is received by the meeting agent engine 114 when an online meeting begins. In an example, a request to monitor and/or manage a meeting is received by the meeting agent engine 114, when a meeting invitee submits a request to receive notifications for a meeting. This may occur, when the meeting invitee receives and/or reviews the meeting invitation or when a meeting invitee joins the meeting. If the meeting invitee subsequently leaves the meeting or keeps the meeting screen open but begins working on another project and as such becomes an inactive participant, the request to monitor the meeting may be transmitted to the meeting agent engine 114. The request may be transmitted by the applications 112/134 of FIG. 1A.

Once the request to monitor an online meeting is received, the meeting agent engine 114 may retrieve various data relating to the meeting. The data may include meeting metadata 150, user data 152 and meeting content data 60. Meeting metadata may refer to any metadata available for online meetings and may include meeting time/date, meeting duration, list of meeting invitees, list of meeting attendees, list of active meeting participants, meeting title, meeting organizer, and type of meeting (e.g., work related, social meeting, educational meeting, etc.). This information may be retrieved from the application used to conduct the meeting and/or the application used to schedule the meeting. In some implementations, the metadata information is available in the substrate.

User data 152 may refer to information about meeting invitees, their roles in the organization, and their associations with one another. In some implementations, this information is received from an organizational graph that stores information about various users in an organizer. The information may include a user's job title, job duties, active projects, the people they normally work with, their organizational associations with other users (e.g., their manager, the people they manage) and the like. This information may be retrieved for a meeting attendee that has requested notification or is otherwise identified as requiring notification or for all meeting attendees.

The meeting content data 160 may include various types of content collected during the online meeting. In some implementations, the meeting content data 160 includes audio/video data 162 which may be the audio and/or video signal collected during the meeting. This data may be used to detect keywords such as a meeting attendee's name or active project. In some implementations, the audio/video data 162 is used to transcribe the meeting. In other implementations, a separate transcription service is used for transcribing the content of the meeting from speech to text. The transcript data 164 may then be transmitted to the meeting agent engine 114 for use in monitoring the meeting. The transcript data 164 may be provided in real time and may include information about the speaker (e.g., use identifier), transcript of the spoken words and/or a timestamp.

The meeting content data 160 may also include shared data 164 and instant messaging (IM) data 166. The shared data 164 may refer to content data from any documents that are shared or presented during the meeting. For example, the shared data 164 may include content of a presentation (e.g., one or more slides) presented during the meeting or pages of a document shown in the meeting. In some implementations, the shared data 164 may also include screen data from the meeting which may include user reactions (e.g., emoticons), detected user gestures, and the like. IM data 166 may refer to any messages exchanged by meeting attendees during the meeting via an IM feature of the online meeting. In an example, the application executing the online meeting provides a chat feature for users to transmit a textual message to one or more meeting attendees during the meeting. Any such messages may be collected and provided the meeting agent engine 114 as part of IM data 166.

Once all the required data is received, the meeting agent engine 114 may transmit the data to various modules to monitor and manage the meeting. In some implementations, the meeting content data 160 is transmitted to the meeting stage model 170 to detect an active stage for the meeting. The meeting stage model 170 may be a multi-class classifier. In an example, the multi-class classifier is a Bidirectional Encoder Representations (BERT) transformer model. Examples of meeting stages include a silence stage, an introductions stage, a socializing stage, a presentation stage (e.g., one person talking), a discussion stage (e.g., a conversation occurring between two or more people), a question-and-answer stage (Q & A), and a final termination stage (e.g., thank you and goodbyes). The meeting stages may be detected by analyzing the meeting transcript data 166 and/or audio/video data 162 to detect specific keywords or interactions taking place. In an example, the silence stage can be detected when there is no conversation taking place. This may involve the use of a rule-based engine that simply looks passage of a threshold period of time without any conversation.

The introduction stage and/or termination stages may be detected by analyzing the transcript or audio data to look for specific keywords such as greetings, introduction phrases, thank you and/or goodbye phrases. The presentation stage may be detected by examining the transcript and/or audio data to determine that only one person is speaking for a threshold amount of time and/or by examining the shared data 166 and determining a user is moving through a shared document (e.g., a presentation document). The conversation stage, on the other hand, may be detected when the transcript data 164 and/or audio data 162 indicate two or more people are conducting a conversation. For example, the data may indicate that the person speaking changes after a threshold amount of time, thus indicating that a dialogue is taking place. Determining other meeting stages such as whether a conversation is social conversation or work related may require the use of an ML model that utilizes NPL or algorithms for analyzing, processing and classifying text. The meeting stage may be detected in real-time and provided as an output meeting stage 180 to the applications 112/134 for display to the user or may be provided to other elements of the meeting agent engine 114, as needed.

In some implementation, the types of potential meeting stages for an online meeting may change based on the type of meeting. For example, while a work meeting may include presentation and discussion stages, an educational meeting (e.g., a university lecture) may include a lecture stage and a Q&A stage. The meeting stage model 170 or a separate ML model may utilize the meeting metadata 150 and/or meeting content data 160 to detect the type of meeting before identifying the meeting stage. In an example, the meeting stage model 170 may determine the type of meeting based on the meeting title, the type of organization for which the meeting is being scheduled, the organizer's role (e.g., a university professor or an employee of an enterprise) and the like. This may involve the use of an ML model that receives the meeting metadata 150 and/or user date 152 as inputs and provides the type of meeting as an output. In another example, the type of meeting is determined based on the content of the meeting content data 160. This may be achieved by using binary classifiers and/or rule-based algorithms.

The meeting agent engine 114 may also include a meeting summarizing model 172 for generating a summary of the meeting in real-time. This may involve the use of one or more rule-based algorithms and/or ML models. For example, when a presentation is being conducted by a meeting attendee, the meeting summarizing model 172 may utilize a rule-based algorithm to extract the titles of the presentation slides to generate a summary of the meeting. Alternatively and/or additionally, the meeting summarizing model 172 may utilize an ML model that analyzes the transcript data 164 to identify keywords of interests and/or create a summary of the discussions or presentations using NPL and/or other types of models. In an example, the meeting summarizing model 172 receives the detected meeting stages from the meeting stage model 170 and utilizes the stage to provide of summary of meeting stages that have so far occurred in the meeting (e.g., the meeting started with silence, continued to introductions and a presentation and is now in a discussion stage). The meeting summarizing model 172 may also utilize the transcript and/or meeting metadata to provide a list of active meeting participants, meeting speakers, the current length of the meeting, the amount of time remaining in the meeting and the like. Some or all of the summary information may be provided as meeting summary output 182 to the applications 112/134 or to other elements of the meeting agent engine 114. The applications 112/134 may utilize the meeting summary data 182 to display a summary of relevant meeting information to a user. While the summary is created in real-time and may be provided during the meeting, the meeting summary data 182 may be stored and utilized by meeting attendees or others, after a meeting has concluded.

In some implementations, the meeting agent engine 114 includes a meeting topic model 174 for detecting the topic of the meeting in real-time. This may involve the use of one or more rule-based algorithms and/or ML models. For example, the meeting topic model 174 may utilize a rule-based algorithm that receives and analyzes the audio/video data 162 and/or the transcript data 164 to look for specific keywords such as a project name, a meeting invitee's name, a meeting invitee's role, and the like to determine that the current topic is relevant to a specific meeting invitee. Furthermore, the meeting agent engine 114 may include one or more ML models that analyze the meeting transcript data 154 to identify relevant topics. This may be achieved by utilizing ML Models that employee NPL and/or language classifiers. In an example, the ML models used by the meeting topic model 174 receive the meeting stage 180 and/or meeting summary 182 and use the current meeting stage and/or summary information in determining the meeting topic. The detected meeting topic 184 may be provided as an output of the meeting topic model 174 to the applications 112/134 or two other elements of the meeting agent engine 114.

The meeting agent engine 114 may also include user notification engine 176 for determining when a notification to a user is needed. This may be achieved by examining the meeting metadata which may include information about meeting invitees that have requested receiving notifications during the meeting. As discussed above, a request to receive notification may be submitted by a meeting invitee when they view the meeting invitation. For example, when submitting their response, meeting invitees may be able to choose an option to only participate in selected sections of the meeting. The meeting invitees may then be able to choose the meeting stages or topics they are interested in. For example, a college student who has been invited to multiple lectures at the same time may indicate that they are interested in participating in the Q&A section of the lecture. In another example, a busy employee may indicate that they only interested to participate when their name or the name of specific project is mentioned during the meeting. The user may be able to enter the meeting stages, attendee names and/or topics they are interested in. This information may be collected and stored as part of meeting metadata 150 which may then be examined by the user notification engine 176 to determine when a user notification is required.

When upon examining the meeting metadata 150, the user notification engine 176 detects that a current meeting includes a request by one or more meeting attendees, it may examine the meeting stage 180, meeting topic 184, audio/video 162, transcript data 164, shared data 166 and/or IM data to determine if the meeting attendee's name has been mentioned, topic of interest has been introduced or meeting stage of interest is currently taking place. Upon detection of one or more of these events, the user notification engine 176 may calculate a confidence score for the user needing to join the meeting. When the confidence score exceeds a predetermined threshold, the user notification engine 176 may generate and provide notification data 186 as an output. The notification data 186 may include identifying information about the meeting attendee who needs to be notified, as well as display data such as the event that prompted the notification (e.g., your name was mentioned, your project was mentioned, meeting discussion has begun, etc.). In some implementations, the notification data 186 includes meeting summary 182 and/or meeting topic 184 to inform the user of sections of the meeting they have missed and enable them to quickly gather some information to be able to engage effectively during the meeting.

In some implementations, notifications are provided, even when a user request for notification has not been received. For example, specific prompts in a meeting may lead to user notification (e.g., Joe, your input is really needed here). In another example, when a meeting participant who has joined the meeting is working on other projects (e.g., the meeting screen is minimized on their screen) and their name or the name of their project is mentioned, the user notification engine 176 may determine that notification is required, even if the user has not submitted a request for one.

Figure 1C:
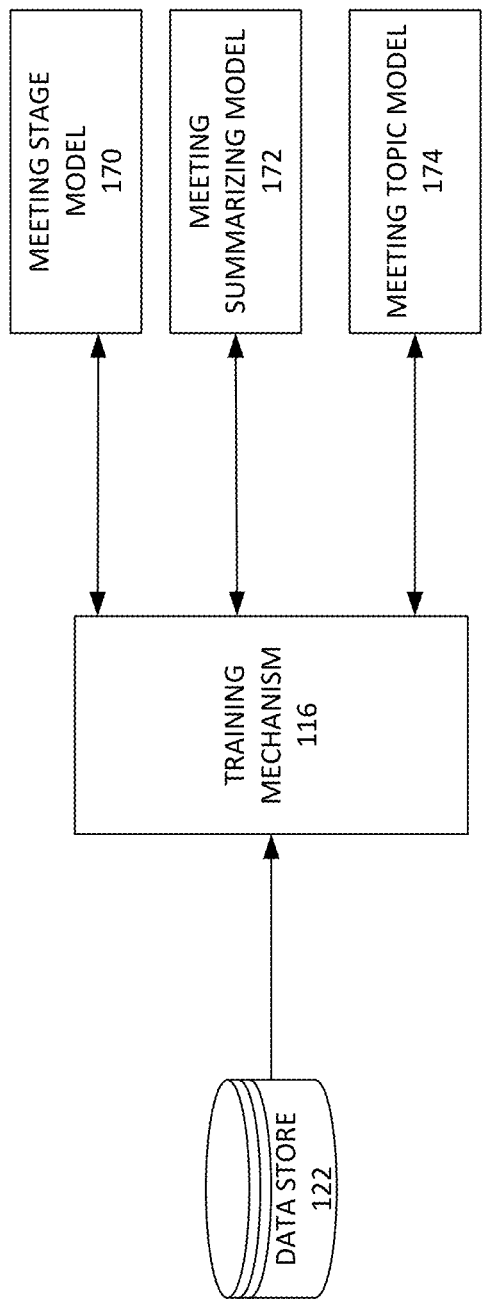
FIG. 1C how one or more ML models used by a meeting agent engine may be trained.

FIG. 1C depicts how one or more ML models used by the meeting agent engine 114 may be trained by using the training mechanism 116. The training mechanism 116 may use labeled training data sets stored in the data store 122 to provide initial and ongoing training to the meeting stage model 170, meeting summarizing model 172, meeting topic model 174 and/or any models used by the user notification engine 176. In some implementations, a training dataset which includes labeled meeting content and corresponding meeting stages and/or events (e.g., prompts) that should result in a notification may be used to train the meeting stage model 170 and/or models used by the user notification engine 176.

One or more models used to determine if a user notification should be provided may be trained using labeled data collected from meeting transcripts. The data may be labeled by extracting lines from the transcript that correspond to a person being looked for. The extracted lines may then be used to create a data template that is automatically filled in with random names. In an example, random names are collected using U.S. census information to create positive labels. The remaining lines from the transcript then become negative labels. Labeled data augmented using this approach may be used to train a BERT transformer binary classifier to determine if a person's name is mentioned during a meeting. In an example, the actual names are extracted from the transcript using known in the art techniques such as those available by the spacy library.

In some implementations, to provide ongoing training, the training mechanism 116 may use training data sets received from each of the ML models. Furthermore, data may be provided from the training mechanism 116 to the data store 122 to update one or more of the training datasets in order to provide updated and ongoing training. Additionally, the training mechanism 116 may receive training data such as knowledge from other pre-trained mechanisms.

Figure 2A:
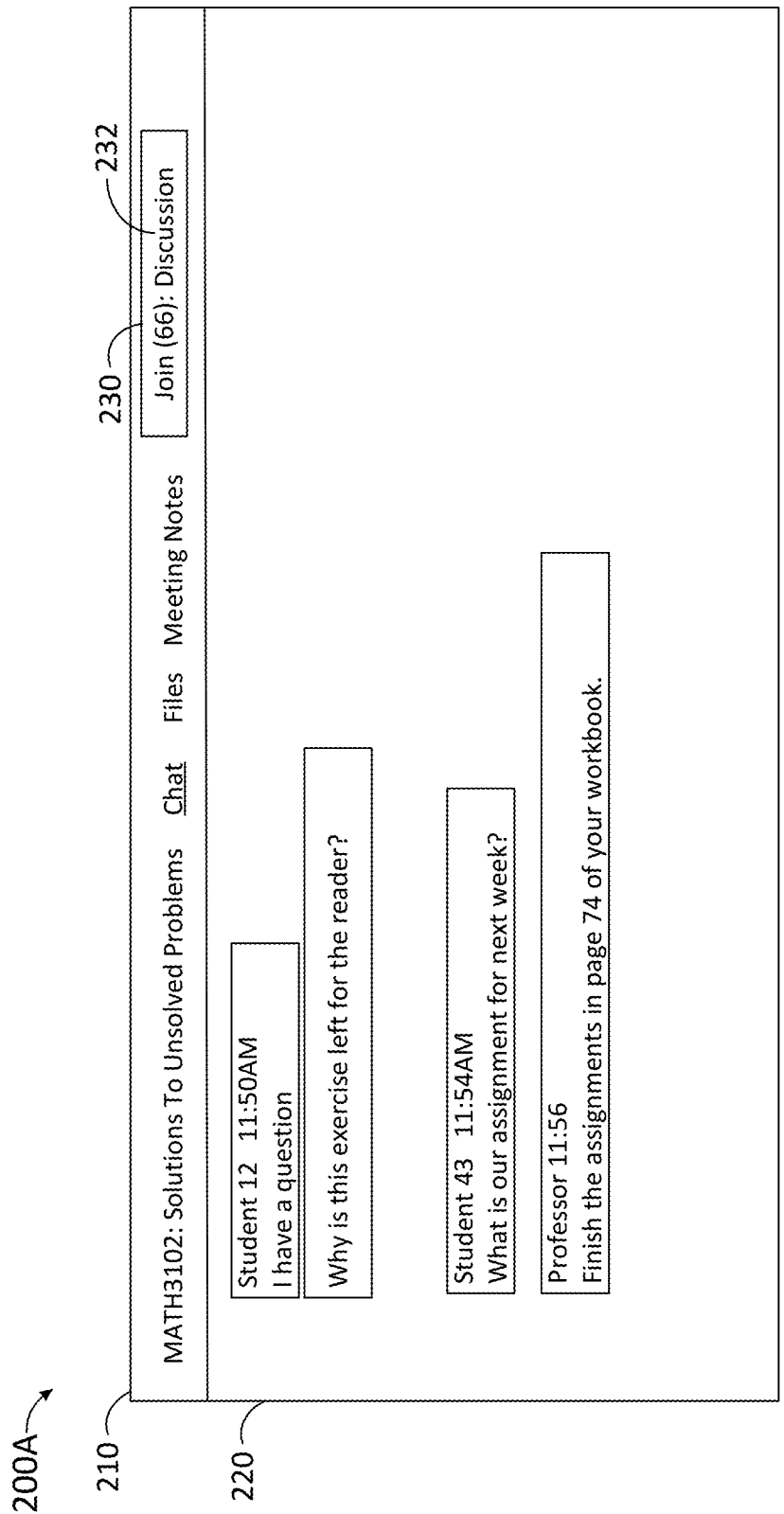
FIGS. 2A-2B depict example graphical user interface (GUI) screens of an application or service that provides meeting monitoring and/or notification services.
Figure 2B:
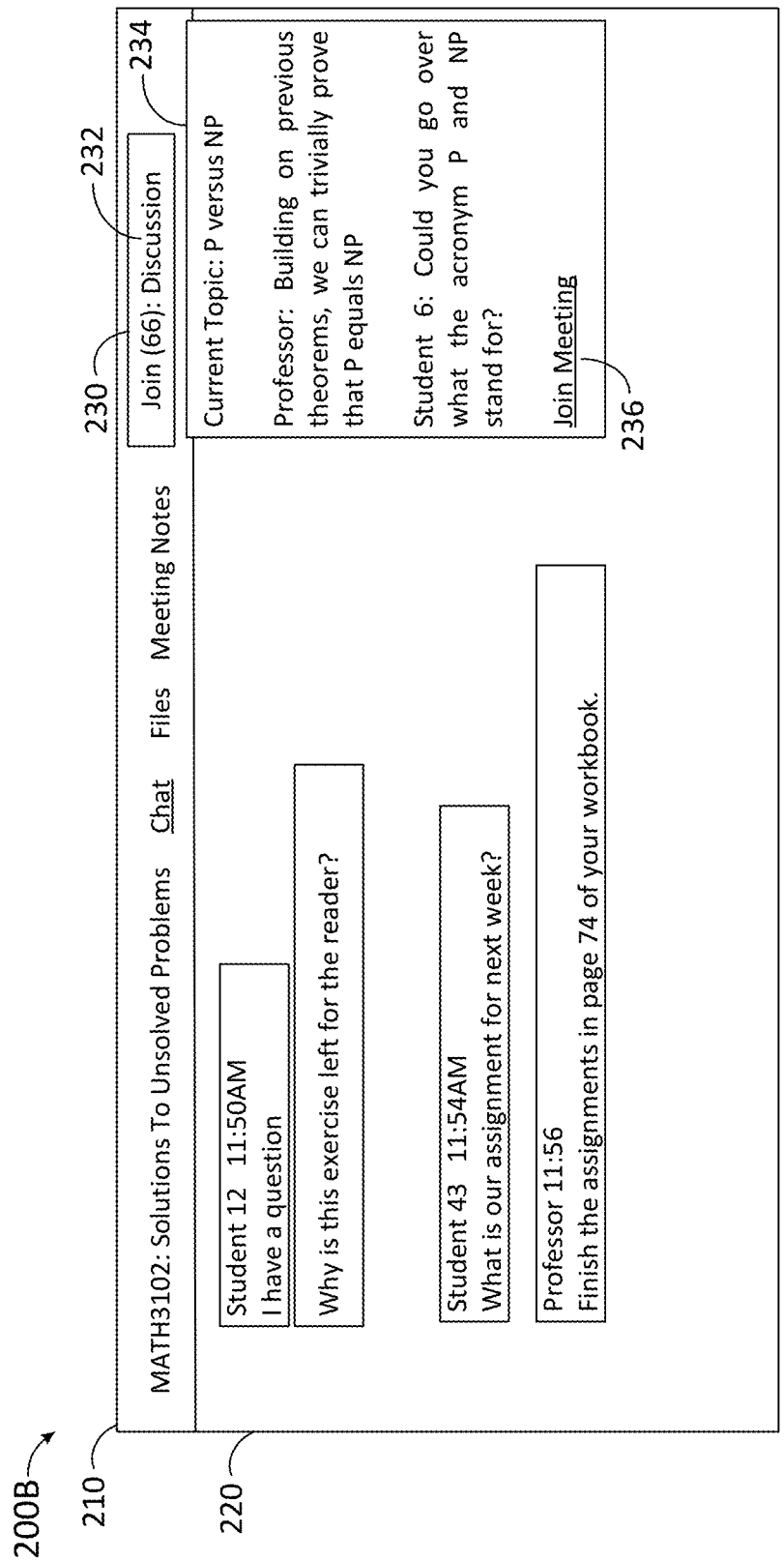

FIGS. 2A-2B depict example GUI screens of an application or service that provides meeting monitoring and/or notification services. FIG. 2A depicts an example GUI screen 200A of an online meeting application (e.g., Microsoft Teams) displaying an example chat feature. GUI screen 300A may be displayed by an online meeting application that provides a chat feature while the meeting is in progress. In an example, the GUI screen 300A is displayed to users who have been invited to a meeting but have not yet joined. A meeting invitee may select a menu option in the online meeting application for displaying the chat feature, even if they have not joined the meeting. The GUI screen 200A may include a toolbar menu 210 displaying the title of the meeting and containing various menu tabs for performing a variety of tasks in the application. For example, the toolbar menu 310 may include a chat tab (which is selected in GUI screen 200A) for displaying the instant messages exchanged during the meeting. The instant messages may be displayed in a message pane 220. In an example, the message pane 220 may display each instant message from a different meeting attendee in a separate user interface (UI) element (e.g., box).

The toolbar menu 210 may include a UI element 230 for enabling the user to join the meeting. To provide information that may assist the user in choosing when to join the meeting, the UI element 230 may include the current detected stage 232 of the meeting. For example, the UI element 230 informs the user that the meeting is in the discussion stage. The UI element 230 may also display the number of meeting participants (e.g., 66). In this manner, the GUI screen 200A provides a quick and efficient mechanism for offering information to the user that can help the user gauge when to join an ongoing meeting. The user may be able to join the meeting by selecting the UI element 230 (e.g., clicking on the UI element 230).

In some implementations, the user may take certain actions with respect to the UI element 230 (or may be provided another menu option) for receiving more information about the meeting. In an example, hovering over or right-clicking on the UI element 230 results in the display of additional information about the meeting. This is depicted in the GUI screen 200B of FIG. 2B. Additional information about the meeting may be provided in a UI element such as the menu option 234. The menu option 234 may be a pop-up menu and may include information such as the current topic of the meeting, a transcript of the latest discussions, and a menu option 236 for joining the meeting directly from the menu option 234. In other implementations, the menu option 234 may include additional or different information about the meeting. For example, it may include a summary of topics discussed so far during the meeting, a summary of meeting stages that have occurred, names of documents that have been shared, and the like. In an example, the menu option 234 may include additional UI elements for displaying additional information about the meeting. For example, a menu option for viewing a summary of the meeting may be provided, in which case, upon invoking the menu option, the summary may be displayed in a different UI element. Access to additional information about the meeting may be provided in other manners. For example, the toolbar menu 210 may include a separate UI element for viewing a summary of the meeting and the like.

Figure 3A:
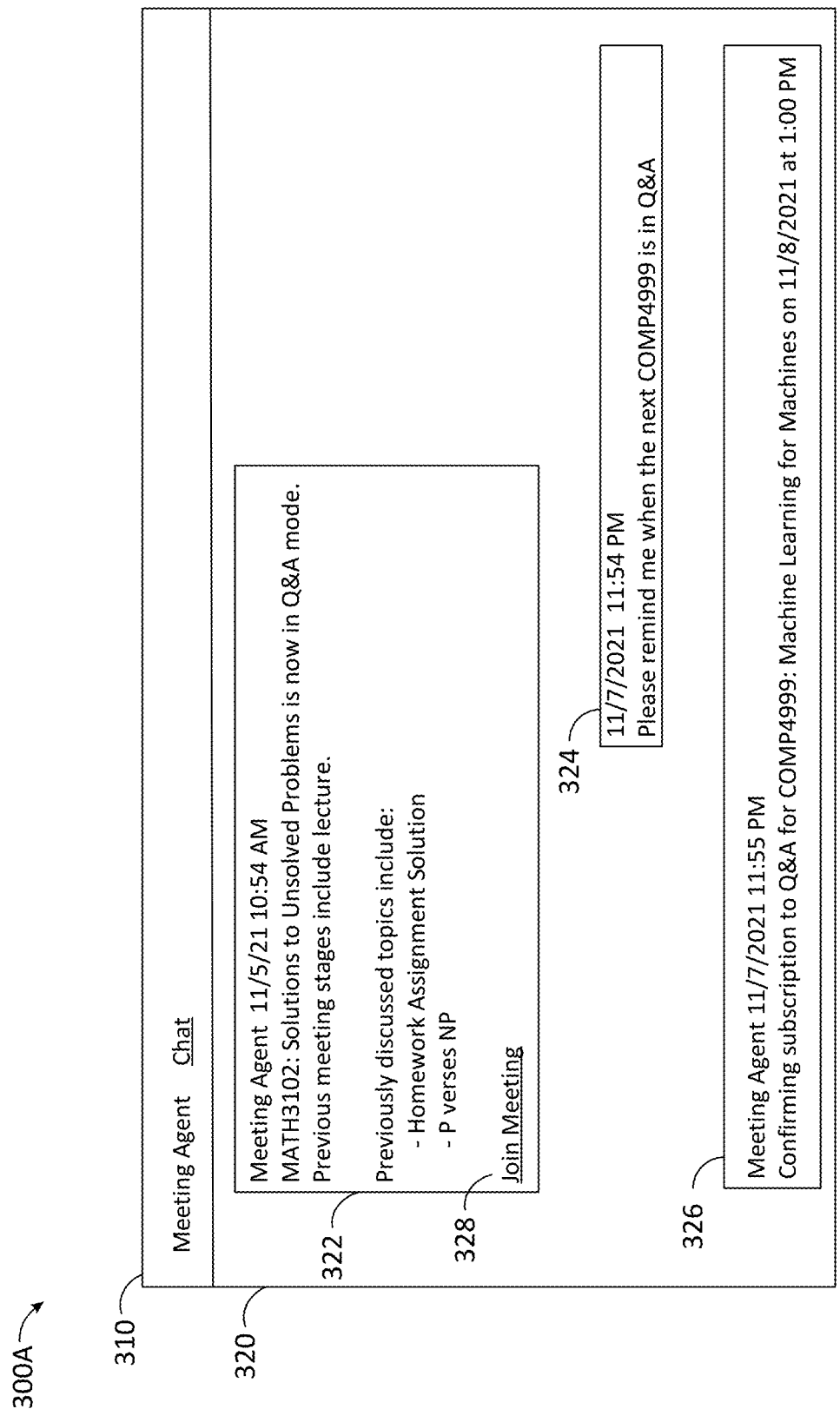
FIGS. 3A-3C depict example GUI screens for providing notifications to a user during a meeting.
Figure 3B:
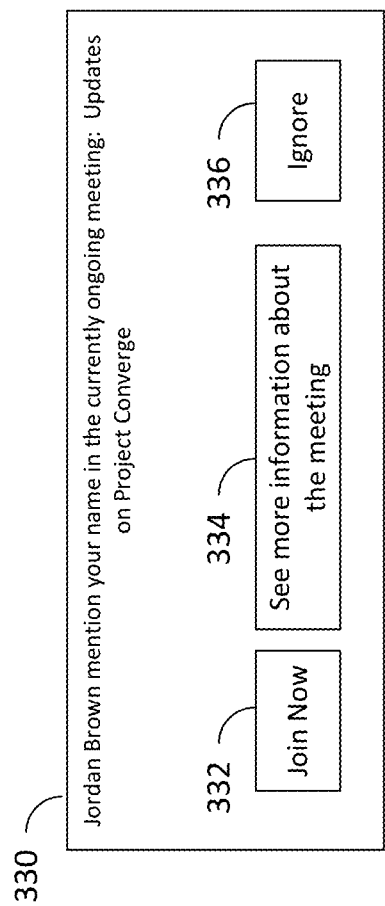
Figure 3C:
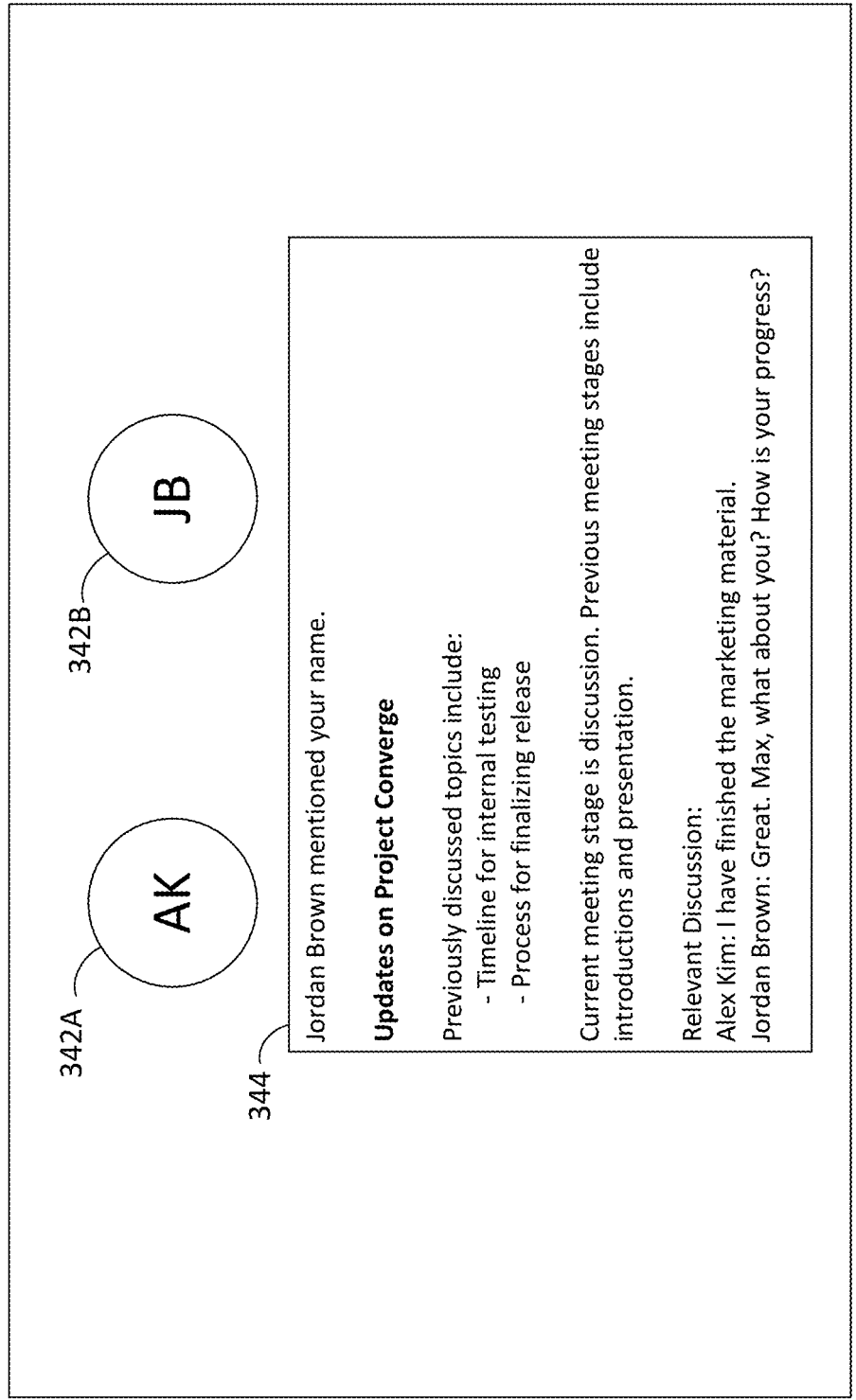

FIGS. 3A-3C depict example GUI screens for providing notifications to a user during a meeting. FIG. 3A depicts an example GUI screen 300A of an online meeting application (e.g., Microsoft Teams®) that provides a meeting agent feature. The meeting agent may function as a meeting assistance that helps the user subscribe to various stages of one or more meetings, request notifications upon occurrence of certain events, and the like. The GUI screen 300A may include toolbar menu 310 indicating that the screen relates to the meeting agent and enables the user to chat with the meeting agent. In an example, the meeting agent may function as a bot by enabling the user to communicate with the meeting agent. This may be provided by a bot service that utilizes one or more known ML models for operating as a bot.

In some implementations, the meeting agent notifies the user when a meeting stage to which the user has subscribed begins. This may be achieved by displaying a UI element 322 (e.g., a dialogue box) that provides the title of the meeting, informs the user that their requested meeting stage has started, and/or offers additional information about the meeting. In an example, the additional information includes previously discussed topics. In another example, previous meeting stages and/or the transcript of the latest conversations may also be displayed. The UI element 322 may provide a menu option 328 for joining the meeting directly from the UI element 322. In this manner, the user can quickly glean the state of the meeting from the information provided and efficiently join the meeting directly from the same screen.

The meeting agent may enable the user to directly subscribe to a specific stage or event of an upcoming meeting.

For example, the user may type into an input box 324 and request the meeting agent to remind the user when the next COM4999 meeting is in the Q&A stage. In another example, the user may request that the meeting agent notify the user when their name or a specific phrase (e.g., project name, tool name, topic, etc.) is mentioned during the meeting. Upon submitting the request, the meeting agent may confirm the user's request by displaying a UI element 326 which provides a confirmation message containing the name of the meeting, the date/time at which the meeting will occur, and the stage to which the user subscribed.

It should be noted that the meeting agent feature displayed in FIG. 3A is illustrative of one manner in which a user can request notification for upcoming meetings. Many other UI features may be provided. For example, the online application may have a separate tab with one or more menu options for setting up notifications. In another example, the application used to send a meeting invitation may provide features for setting up notifications. For example, the meeting invitation itself may provide menu options for choosing to receive notifications upon various events.

In some implementations, when the event the user has subscribed to occurs, a pop-up menu option or other type of UI element is displayed on the user's screen to notify the user of the event. The pop-up menu option may be displayed on the active screen of the user. For example, if the user is working on a document and has not joined the meeting, the pop-up menu option may be overlayed on the document the user is working on. In another example, the notification may be presented in a notifications' section of a taskbar displayed on the side or the bottom of the screen. FIG. 3B displays an example of such a UI element. The UI element 330 may notify the user of the event that triggered the notification (e.g., a specific meeting stage or the user's name being mentioned in the meeting). Furthermore, the UI element 330 may provide the title of the meeting and include the name of the meeting attendee who mentioned the user's name. To enable the user to quickly join the meeting when desired, the UI element 330 may include a menu option 332 for joining the meeting. Moreover, a menu option 334 may be provided for seeing more information about the meeting. Upon selectin of the menu option 334, a separate UI element displaying various additional information (e.g., meeting summary, meeting stages, latest transcript, etc.) may be presented. Furthermore, the UI element 330 may include a menu option 336 for ignoring the notification.

In some scenarios, a user may decide to join a meeting, but later get distracted or choose to begin working on another project due to lack of relevance of meeting contents and/or other reasons. In such instances, if during the meeting, the user's name or other relevant information is mentioned, the meeting agent may detect that the user is not activity participating in the meeting (e.g., the meeting window is not active on the user's screen, or the user is working on another document) and as such may determine that a notification to the user is warranted. When this occurs, the meeting screen may automatically be made active (e.g., the meeting screen is brought forward on the screen) and/or a notification may be displayed to the user.

FIG. 3C displays an example GUI screen 300C of an ongoing meeting that is displayed to an inactive meeting participant to notify them of a relevant event. The GUI screen 300C may include icons 324A-342B for various meeting participants. Furthermore, the GUI screen 300C may display a UI element 344 for providing notification to the user. In an example, the UI element 344 includes information about the triggering event (e.g., your name was mentioned). Furthermore, the UI element 344 may include additional information that enables the user to quickly gain an understanding of the state of the meeting and as such be able to effectively engage with other meeting attendees. For example, the UI element 344 may include the title of the meeting, the previously discussed topics, the current stage as well as the previous stages of the meeting, and the relevant discussion that led to the notification. In this manner, not only is the user notified of an event during the meeting that requires their attention, but they are also informed of the latest happenings in the meeting. In other implementations, the UI element 344 may include additional information such as the titles of the slides presented during the meeting, the names of meeting attendees who spoke during the meeting, and the like.

Figure 4:
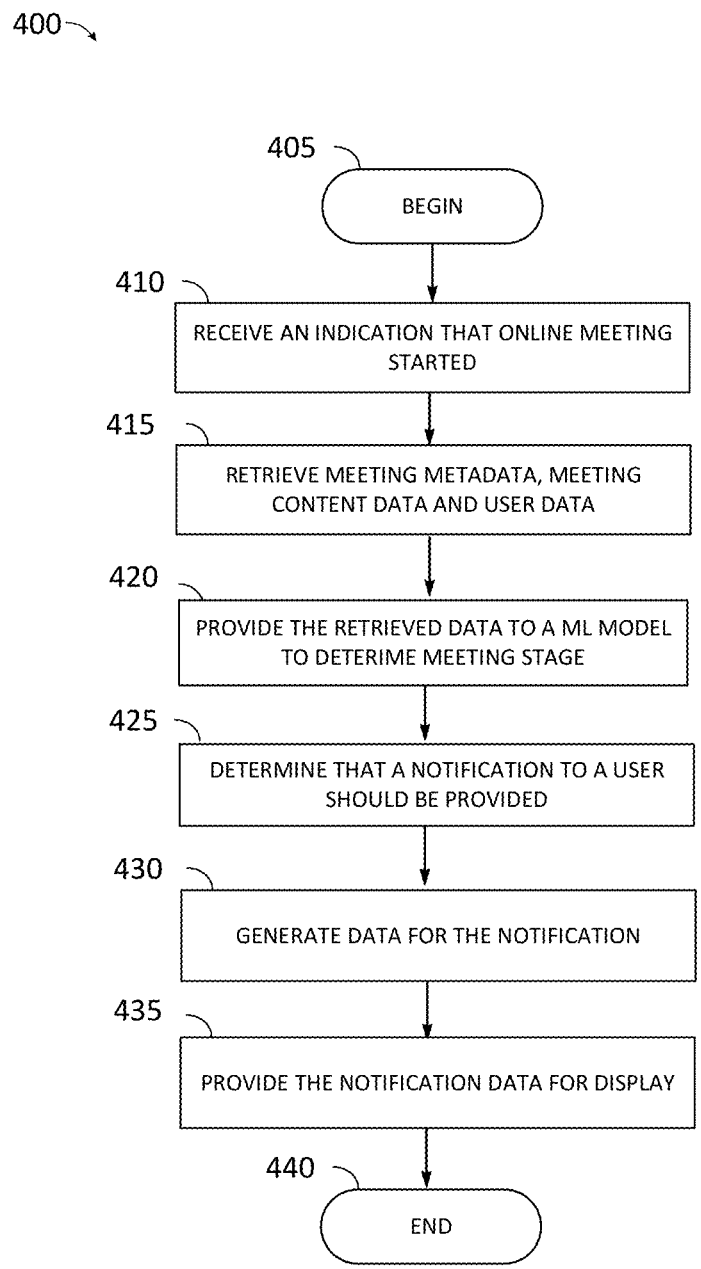
FIG. 4 is a flow diagram depicting an example method for intelligently monitoring a meeting and notifying meeting invitees, when needed.

FIG. 4 is a flow diagram depicting an exemplary method 400 for intelligently monitoring a meeting and notifying meeting invitees, when needed. One or more steps of the method 400 may be performed by a meeting agent engine such as the meeting agent engine 114 of FIGS. 1A-1B or by an application such as applications 112/134 of FIGS. 1A-1B. The method 400 may begin, at 405, and proceed to receive an indication that an online meeting has started, at 410. This may occur, for example, when an online meeting to which one or more meeting attendees have subscribed for notification beings. In other implementations, anytime an online meeting begins, an indication about the meeting is received. This enable monitoring all online meetings such that notifications may be provided even when meeting attendees have not specifically requested such notifications and so that meeting stages can be displayed to meeting attendees that join the meeting after it has been begun.

Once the indication is received, the meeting agent may begin monitoring the meeting in the background. This may be achieved by retrieving one or more of meeting metadata associated with the meeting, meeting content data for the meeting and user data associated with meeting invitees, at 415. The received data may then be examined by one or more ML models to analyze various aspects of the online meeting. In an example, the retrieved data is provided to an ML model to detect a meeting stage for the meeting in real-time, at 420. As discussed above, the meeting stage may be determined based on various parameters and may be continually updated as the meeting progresses. In this manner, meeting stages can be detected in real-time.

After the meeting stage has been detected, method 400 may proceed to determine if a notification to a meeting invitee should be provided, at 425. This may be determined based on various parameters such as the detected meeting stage, whether the meeting invitee's name has been mentioned in the meeting, current meeting topic and the like. When it is determined that a notification should be provided to one of the meeting invitees, method 400 may proceed to generate data for the notification, at 430. The data may include the detected meeting stage, a summary of the meeting, the event that led to generation of the notification (e.g., mention of the user's name), extracts from the meeting transcript and the like. The notification data may then be provided for display, at 435.

Figure 5:
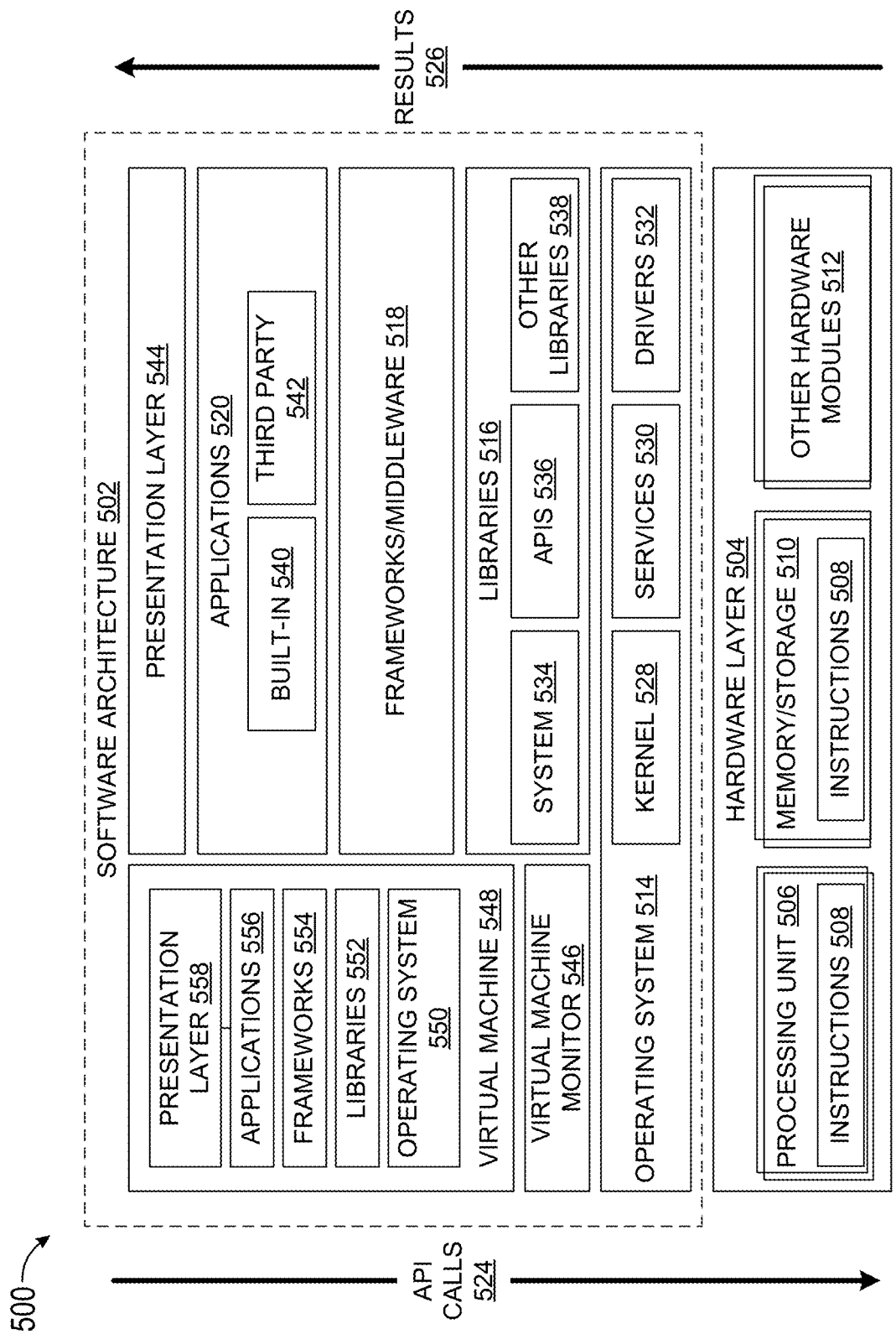
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
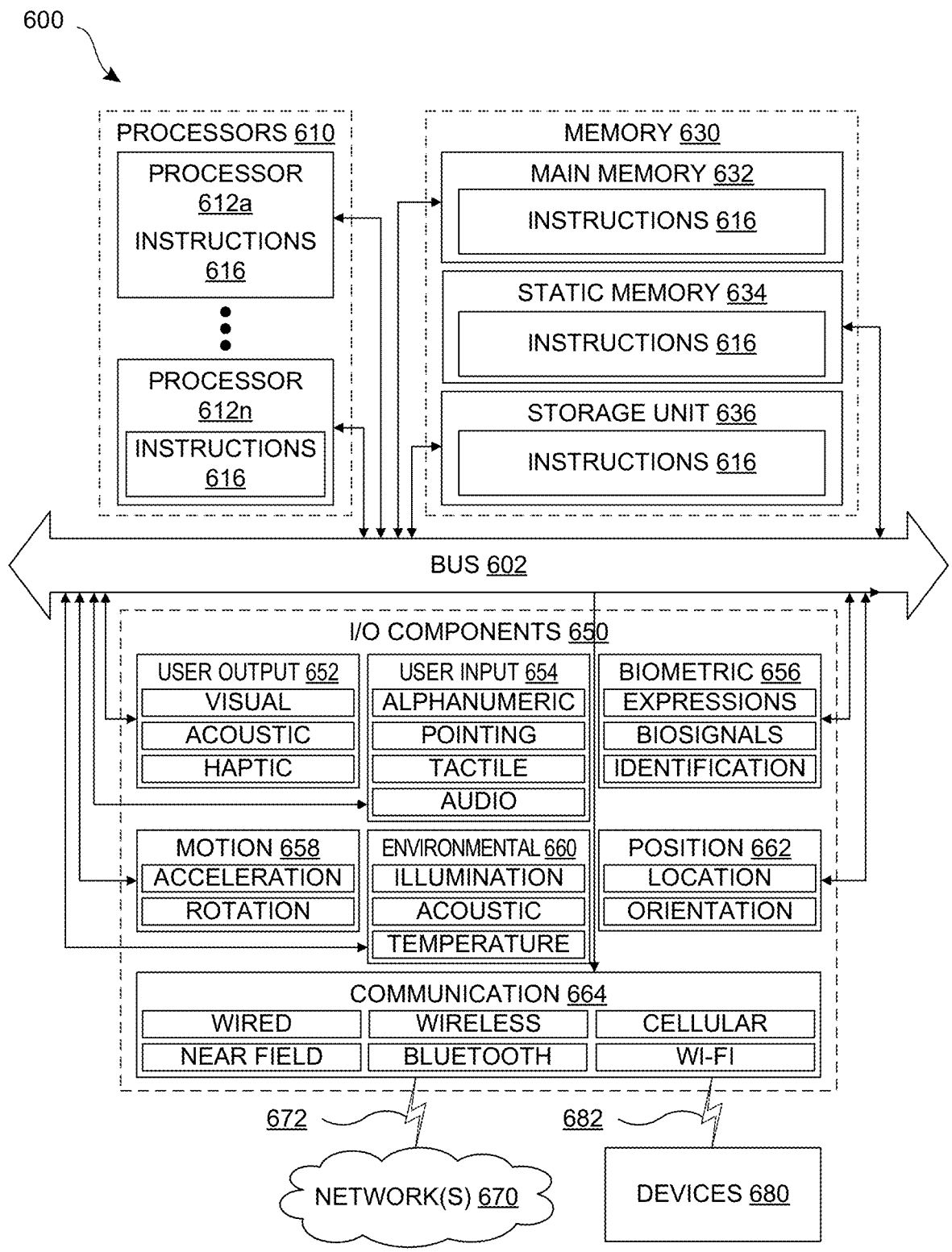
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612*a* to 612*n* that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
receiving an indication that an online meeting has been started;
retrieving meeting metadata associated with the online meeting, meeting content data from the online meeting, and user data associated with one or more meeting invitees;
providing at least one of the meeting metadata, meeting content data and the user data to a machine-learning model for detecting a meeting stage for the online meeting in real-time;
determining, via the processor, and based on at least one of the detected meeting stage, meeting content data or the user data that a notification about the online meeting should be provided to one of the one or more meeting invitees;
upon determining that the notification about the online meeting should be provided, generating data for the notification; and
providing the data for the notification for display to the one of the one or more meeting invitees.

Item 2. The data processing system of item 1, wherein the meeting content data includes at least one of audio data from the online meeting, video data from the online meeting, speech to text transcription data from the online meeting, shared documents data from the online meeting, and instant messaging data from the online meeting.

Item 3. The data processing system of any of items 1 or 2, wherein the meeting stage includes at least one of silence, introductions, socializing, discussion, presentation, lecture and question and answer portion.

Item 4. The data processing system of any preceding item, wherein the executable instructions, when executed by the processor, further cause the data processing system to perform functions of:
determining a meeting type for the online meeting; and
detecting the meeting stage based at least in part on the meeting type.

Item 5. The data processing system of any preceding item, wherein the data for the notification includes information about the online meeting, the information including at least one of the detected meeting stage, previously detected meeting stages, a summary of the online meeting, a prompt for the one of the one or more meeting invitees from the online meeting, and a portion of a transcript from the online meeting.

Item 6. The data processing system of any preceding item, wherein the one of the one or more meeting invitees is not attending the online meeting and the notification informs the one of the one or more meeting invitees that a meeting stage they subscribed to has started or their attention is otherwise needed at the online meeting.

Item 7. The data processing system of any preceding item, wherein the data for the notification displayed to the one or more meeting invitees includes a user interface element for joining the online meeting.

Item 8. A method for monitoring an online meeting comprising:
receiving an indication that the online meeting has been started;
retrieving meeting metadata associated with the online meeting, meeting content data from the online meeting, and user data associated with one or more meeting invitees;
providing at least one of the meeting metadata, meeting content data and the user data to a machine-learning model for detecting a meeting stage for the online meeting in real-time;
determining, via the processor, and based on at least one of the detected meeting stage, meeting content data or the user data that a notification about the online meeting should be provided to one of the one or more meeting invitees;
upon determining that the notification about the online meeting should be provided, generating data for the notification; and
providing the data for the notification for display to the one of the one or more meeting invitees.

Item 9. The method of item 8, wherein the meeting content data includes at least one of audio data from the online meeting, video data from the online meeting, speech to text transcription data from the online meeting, shared documents data from the online meeting, and instant messaging data from the online meeting.

Item 10. The method of any of items 8 or 9, wherein the meeting stage includes at least one of silence, introductions, socializing, discussion, presentation, lecture and question and answer portion.

Item 11. The method of any of items 8-10, further comprising:
determining a meeting type for the online meeting; and
detecting the meeting stage based at least in part on the meeting type.

Item 12. The method of any of items 8-11, wherein the data for the notification includes information about the online meeting, the information including at least one of the detected meeting stage, previously detected meeting stages, a summary of the online meeting, a prompt for the one of the one or more meeting invitees from the online meeting, and a portion of a transcript from the online meeting.

Item 13. The method of any of items 8-12, wherein the one of the one or more meeting invitees is not attending the online meeting and the notification informs the one of the one or more meeting invitees that a meeting stage they subscribed to has started or their attention is otherwise needed at the online meeting.

Item 14. The method of any of items 8-13, wherein the data for the notification displayed to the one or more meeting invitees includes a user interface element for joining the online meeting.

Item 15. A non-transitory computer readable medium on which are stored instructions that, when executed, cause a programmable device to perform functions of:
receiving an indication that an online meeting has been started;
retrieving meeting metadata associated with the online meeting, meeting content data from the online meeting, and user data associated with one or more meeting invitees;
providing at least one of the meeting metadata, meeting content data and the user data to a machine-learning model for detecting a meeting stage for the online meeting in real-time;
determining, via the processor, and based on at least one of the detected meeting stage, meeting content data or the user data that a notification about the online meeting should be provided to one of the one or more meeting invitees;
upon determining that the notification about the online meeting should be provided, generating data for the notification; and
providing the data for the notification for display to the one of the one or more meeting invitees.

Item 16. The non-transitory computer readable medium of item 15, wherein the meeting content data includes at least one of audio data from the online meeting, video data from the online meeting, speech to text transcription data from the online meeting, shared documents data from the online meeting, and instant messaging data from the online meeting.

Item 17. The non-transitory computer readable medium of any items 15 or 16, wherein the meeting stage includes at least one of silence, introductions, socializing, discussion, presentation, lecture and question and answer portion.

Item 18. The non-transitory computer readable medium of any of items 15-17, wherein the data for the notification includes information about the online meeting, the information including at least one of the detected meeting stage, previously detected meeting stages, a summary of the online meeting, a prompt for the one of the one or more meeting invitees from the online meeting, and a portion of a transcript from the online meeting.

Item 19. The non-transitory computer readable medium of any of items 15-18, wherein the one of the one or more meeting invitees is not attending the online meeting and the notification informs the one of the one or more meeting invitees that a meeting stage they subscribed to has started or their attention is otherwise needed at the online meeting.

Item 20. The non-transitory computer readable medium of any of items 15-19, wherein the data for the notification displayed to the one or more meeting invitees includes a user interface element for joining the online meeting.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by the processor, cause the data processing system to perform functions of:
   receiving an indication that an online meeting has started;
   retrieving meeting metadata associated with the online meeting, meeting content data from the online meeting, and user data associated with one or more meeting invitees;
   providing at least one of the meeting metadata, meeting content data and the user data to a machine-learning model for detecting a meeting stage for the online meeting in real-time;
   receiving from the machine-learning model a detected meeting stage in real-time as an output;
   determining, via the processor, and based on at least one of the detected meeting stage, meeting content data or the user data that a notification about the online meeting should be provided to one of the one or more meeting invitees;
   upon determining that the notification about the online meeting should be provided, generating data for the notification; and
   providing the data for the notification for display to the one of the one or more meeting invitees,
   wherein:
   the machine-learning model is trained by using a training dataset which includes labeled meeting content and corresponding meeting stages, and
   one of the one or more meeting invitees is not attending the online meeting and the notification informs the one of the one or more meeting invitees that a meeting stage they subscribed to has started or their attention is otherwise needed at the online meeting.

2. The data processing system of claim 1, wherein the meeting content data includes at least one of audio data from the online meeting, video data from the online meeting, speech to text transcription data from the online meeting, shared documents data from the online meeting, and instant messaging data from the online meeting.

3. The data processing system of claim 1, wherein the meeting stage includes at least one of silence, introductions, socializing, discussion, presentation, lecture and question and answer portion.

4. The data processing system of claim 1, wherein the executable instructions, when executed by the processor, further cause the data processing system to perform functions of:
   determining a meeting type for the online meeting; and
   detecting the meeting stage based at least in part on the meeting type.

5. The data processing system of claim 1, wherein the data for the notification includes information about the online meeting, the information including at least one of the detected meeting stage, previously detected meeting stages, a summary of the online meeting, a prompt for the one of the one or more meeting invitees from the online meeting, and a portion of a transcript from the online meeting.

6. The data processing system of claim 1, wherein the data for the notification displayed to the one or more meeting invitees includes a user interface element for joining the online meeting.

7. A method for monitoring an online meeting comprising:
   receiving an indication that the online meeting has started;
   retrieving meeting metadata associated with the online meeting, meeting content data from the online meeting, and user data associated with one or more meeting invitees;
   providing at least one of the meeting metadata, meeting content data and the user data to a machine-learning model for detecting a meeting stage for the online meeting in real-time;
   receiving from the machine-learning model a detected meeting stage in real-time as an output;
   determining based on at least one of the detected meeting stage, meeting content data or the user data that a notification about the online meeting should be provided to one of the one or more meeting invitees;
   upon determining that the notification about the online meeting should be provided, generating data for the notification; and
   providing the data for the notification for display to the one of the one or more meeting invitees,
   wherein:
   the machine-learning model is trained by using a training dataset which includes labeled meeting content and corresponding meeting stages, and
   one of the one or more meeting invitees is not attending the online meeting and the notification informs the one of the one or more meeting invitees that a meeting stage they subscribed to has started or their attention is otherwise needed at the online meeting.

8. The method of claim 7, wherein the meeting content data includes at least one of audio data from the online meeting, video data from the online meeting, speech to text transcription data from the online meeting, shared documents data from the online meeting, and instant messaging data from the online meeting.

9. The method of claim 7, wherein the meeting stage includes at least one of silence, introductions, socializing, discussion, presentation, lecture and question and answer portion.

10. The method of claim 7, further comprising:
    determining a meeting type for the online meeting; and
    detecting the meeting stage based at least in part on the meeting type.

11. The method of claim 7, wherein the data for the notification includes information about the online meeting, the information including at least one of the detected meeting stage, previously detected meeting stages, a summary of the online meeting, a prompt for the one of the one or more meeting invitees from the online meeting, and a portion of a transcript from the online meeting.

12. The method of claim 7, wherein the data for the notification displayed to the one or more meeting invitees includes a user interface element for joining the online meeting.

13. A non-transitory computer readable medium on which are stored instructions that, when executed, cause a programmable device to perform functions of:
    receiving an indication that an online meeting has started;
    retrieving meeting metadata associated with the online meeting, meeting content data from the online meeting, and user data associated with one or more meeting invitees;
    providing at least one of the meeting metadata, meeting content data and the user data to a machine-learning model for detecting a meeting stage for the online meeting in real-time;
    receiving from the machine-learning model a detected meeting stage in real-time as an output;
    determining based on at least one of the detected meeting stage, meeting content data or the user data that a notification about the online meeting should be provided to one of the one or more meeting invitees;
    upon determining that the notification about the online meeting should be provided, generating data for the notification; and
    providing the data for the notification for display to the one of the one or more meeting invitees,
    wherein:
        the machine-learning model is trained by using a training dataset which includes labeled meeting content and corresponding meeting stages, and
        one of the one or more meeting invitees is not attending the online meeting and the notification informs the one of the one or more meeting invitees that a meeting stage they subscribed to has started or their attention is otherwise needed at the online meeting.

14. The non-transitory computer readable medium of claim 13, wherein the meeting content data includes at least one of audio data from the online meeting, video data from the online meeting, speech to text transcription data from the online meeting, shared documents data from the online meeting, and instant messaging data from the online meeting.

15. The non-transitory computer readable medium of claim 13, wherein the meeting stage includes at least one of silence, introductions, socializing, discussion, presentation, lecture and question and answer portion.

16. The non-transitory computer readable medium of claim 13, wherein the data for the notification includes information about the online meeting, the information including at least one of the detected meeting stage, previously detected meeting stages, a summary of the online meeting, a prompt for the one of the one or more meeting invitees from the online meeting, and a portion of a transcript from the online meeting.

17. The non-transitory computer readable medium of claim 13, wherein the data for the notification displayed to the one or more meeting invitees includes a user interface element for joining the online meeting.

* * * * *